(12) United States Patent
Prevost

(10) Patent No.: US 11,692,612 B2
(45) Date of Patent: Jul. 4, 2023

(54) RIGID MULTILINEAR ACTUATOR WITH FLEXIBLE STRAND

(71) Applicant: SERAPID FRANCE, Rouxmesnil-Bouteilles (FR)

(72) Inventor: Romain Prevost, Rouxmesnil-Bouteilles (FR)

(73) Assignee: SERAPID-FRANCE, Rouxmesnil-Bouteilles (FR)

( * ) Notice: Subject to any disclaimer, the term of this patent is extended or adjusted under 35 U.S.C. 154(b) by 15 days.

(21) Appl. No.: 17/601,823

(22) PCT Filed: Apr. 3, 2020

(86) PCT No.: PCT/EP2020/059688
§ 371 (c)(1),
(2) Date: Oct. 6, 2021

(87) PCT Pub. No.: WO2020/207933
PCT Pub. Date: Oct. 15, 2020

(65) Prior Publication Data
US 2022/0205515 A1    Jun. 30, 2022

(30) Foreign Application Priority Data

Apr. 10, 2019 (FR) ..................................... 1903853

(51) Int. Cl.
*F16G 13/20* (2006.01)
*F16H 19/06* (2006.01)

(52) U.S. Cl.
CPC ......... *F16G 13/20* (2013.01); *F16H 19/0636* (2013.01)

(58) Field of Classification Search
CPC .... F16G 13/20; F16H 19/0636; F16H 19/064; F16H 19/0645; F16H 19/065; F16H 2019/0686; F16H 2019/085
See application file for complete search history.

(56) References Cited

U.S. PATENT DOCUMENTS 2,554,300 A * 5/1951 Hayakawa .............. F16G 13/14
 254/95
2,574,657 A * 11/1951 Pierce .................... F16G 13/20
 254/98

(Continued)

FOREIGN PATENT DOCUMENTS

CN  101008303 A   8/2007
CN  101629613 A   1/2010

(Continued)

*Primary Examiner* — David M Fenstermacher
(74) *Attorney, Agent, or Firm* — Volpe Koenig

(57) ABSTRACT

A multilinear actuator transmits a force in several directions, and includes complementary actuating strands made of flexible material and provided on a first face with spaced studs, the actuating strands being located opposite each other, the studs meshing with one another, and transverse faces of one stud bear against respective rear and front transverse faces of adjacent studs of the other actuating strand, defining a straight section in which the two actuating strands are rigidly connected, so that the straight section behaves like a rigid bar, said actuating strands including on an outer face, regularly spaced teeth, the actuator including one driving member per actuating strand, meshing with the teeth of the second face of one of said actuating strands to translate said actuating strand, the actuator including a straight section and a straight section in which the actuating strands are meshed, and a curved region located between the straight sections in which the actuating strands are spaced apart.

10 Claims, 6 Drawing Sheets

(56) References Cited

U.S. PATENT DOCUMENTS

| | | | | |
|---|---|---|---|---|
| 3,012,635 | A * | 12/1961 | Blain | H01Q 1/1235 187/250 |
| 4,735,563 | A * | 4/1988 | Tanaka | B29C 45/531 425/127 |
| 4,745,714 | A * | 5/1988 | Matsutani | E04H 12/185 242/399 |
| 4,819,495 | A * | 4/1989 | Hormann | F16H 19/0636 74/424.78 |
| 5,277,097 | A * | 1/1994 | Pehker | F41A 9/43 89/47 |
| 8,567,125 | B2 | 10/2013 | Soerensen | |
| 2004/0220004 | A1 | 11/2004 | Bourc'His | |
| 2007/0169414 | A1 | 7/2007 | Soerensen | |
| 2010/0051424 | A1 * | 3/2010 | Suko | B66F 7/0666 198/850 |
| 2011/0101294 | A1 * | 5/2011 | Yaoi | F16G 13/20 254/385 |
| 2011/0308338 | A1 * | 12/2011 | Schluckebier | F16H 19/0645 74/89.2 |
| 2012/0167542 | A1 * | 7/2012 | Oitaka | F16G 13/20 59/85 |
| 2018/0310804 | A1 * | 11/2018 | Tanaka | F16H 19/0645 |
| 2019/0113104 | A1 * | 4/2019 | Yoon | F16G 13/20 |
| 2019/0331204 | A1 * | 10/2019 | Cai | F16H 19/0663 |
| 2021/0116006 | A1 * | 4/2021 | Kabai | B25J 9/104 |
| 2021/0129358 | A1 * | 5/2021 | Amemiya | F16G 13/20 |
| 2022/0143923 | A1 * | 5/2022 | Collins | B29C 64/236 |

FOREIGN PATENT DOCUMENTS

| | | | | |
|---|---|---|---|---|
| FR | 2826422 A1 | 12/2002 | | |
| JP | 2011163447 A | 8/2011 | | |
| JP | 2012225439 A | * 11/2012 | | B66F 3/06 |
| JP | 2012237406 A | * 12/2012 | | B66F 3/06 |
| WO | 2016047608 A1 | 3/2016 | | |

* cited by examiner

[Fig. 1]
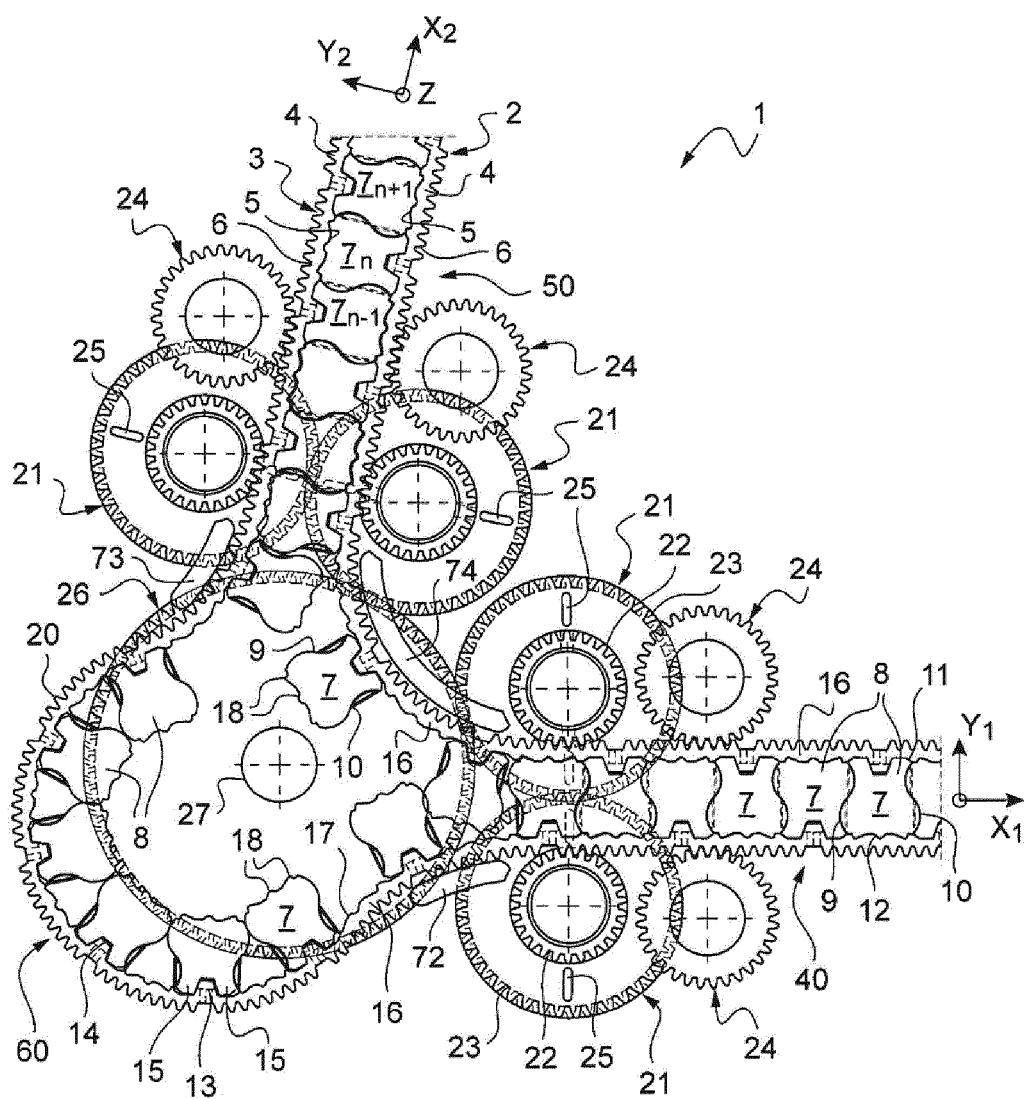

[Fig. 2]
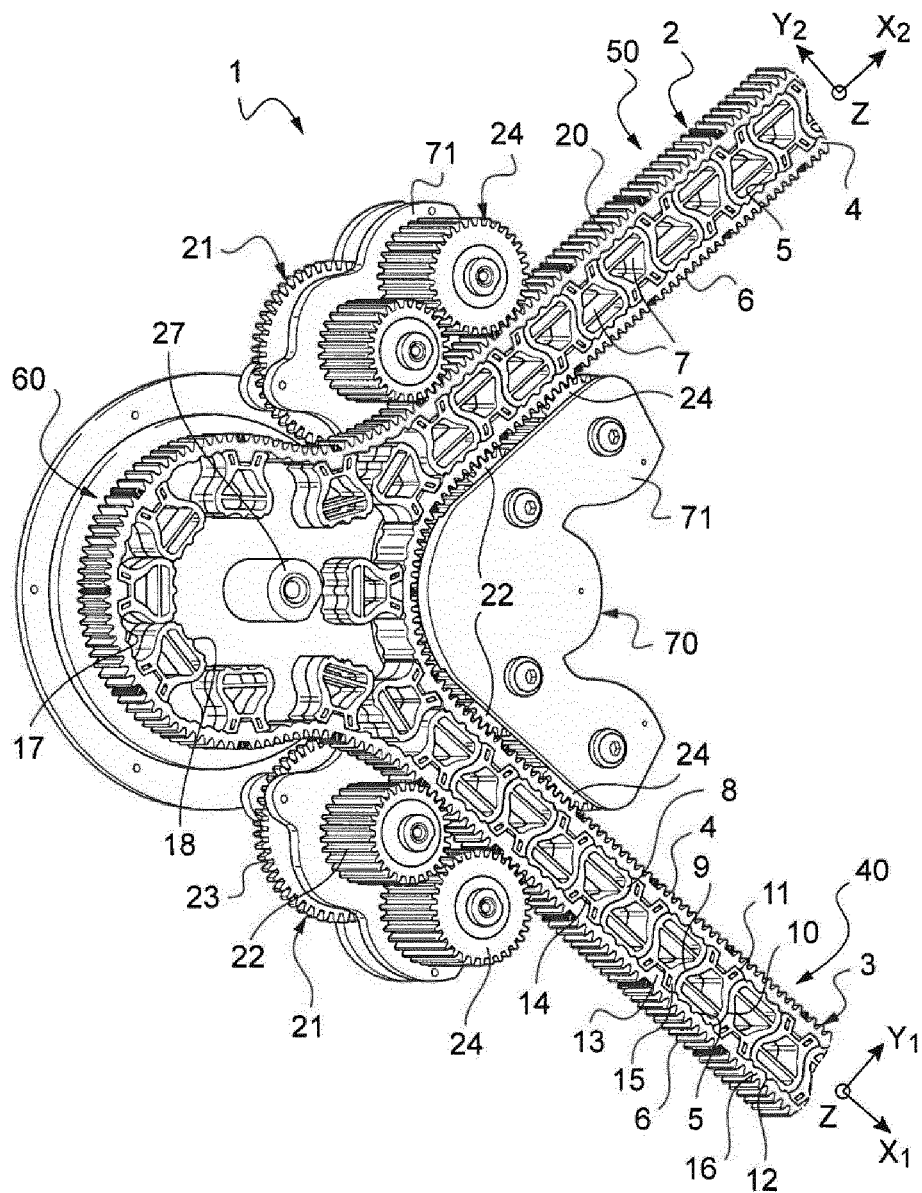

[Fig. 3]
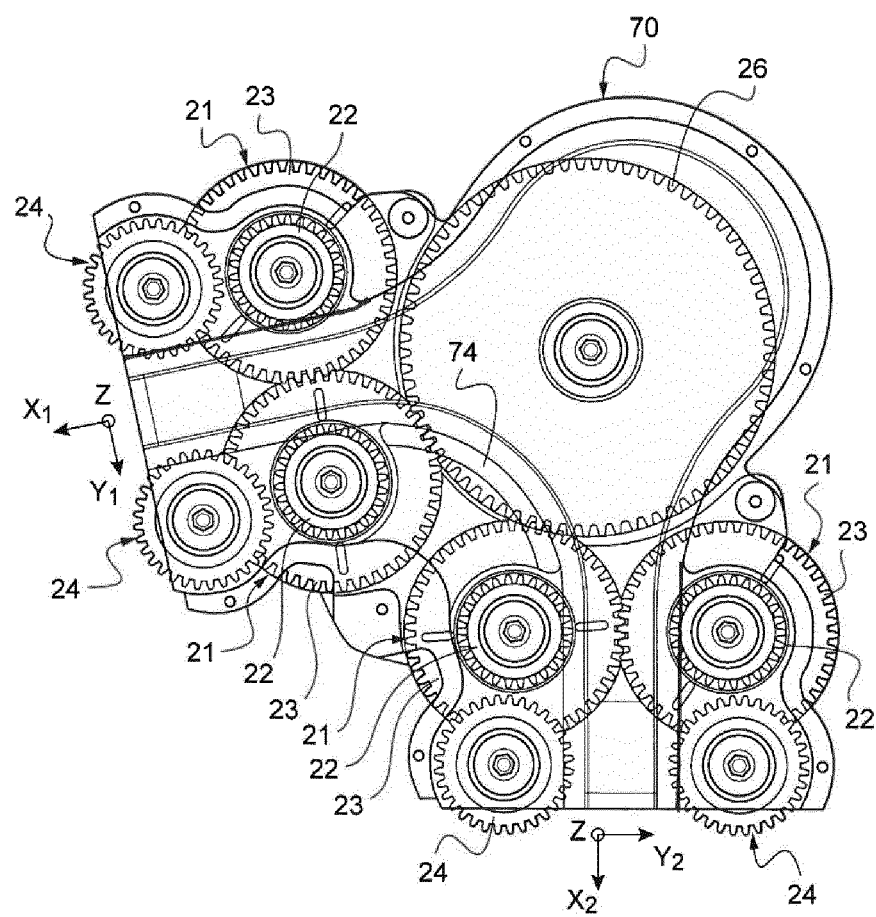

[Fig. 4]
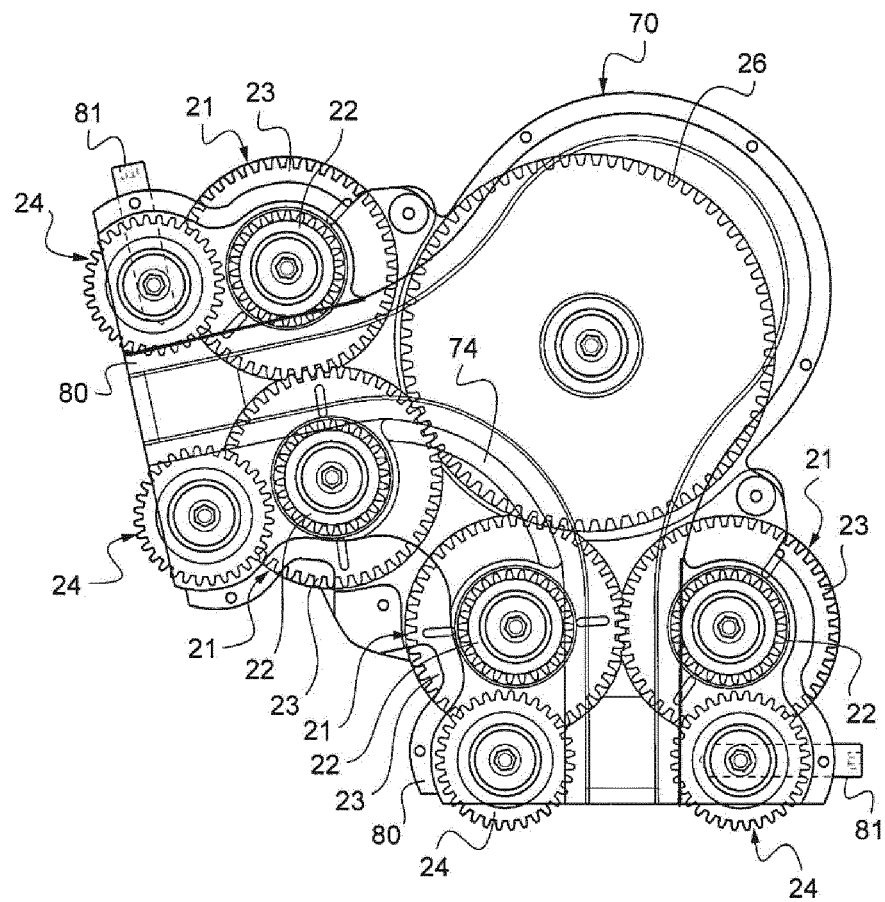

[Fig. 5]
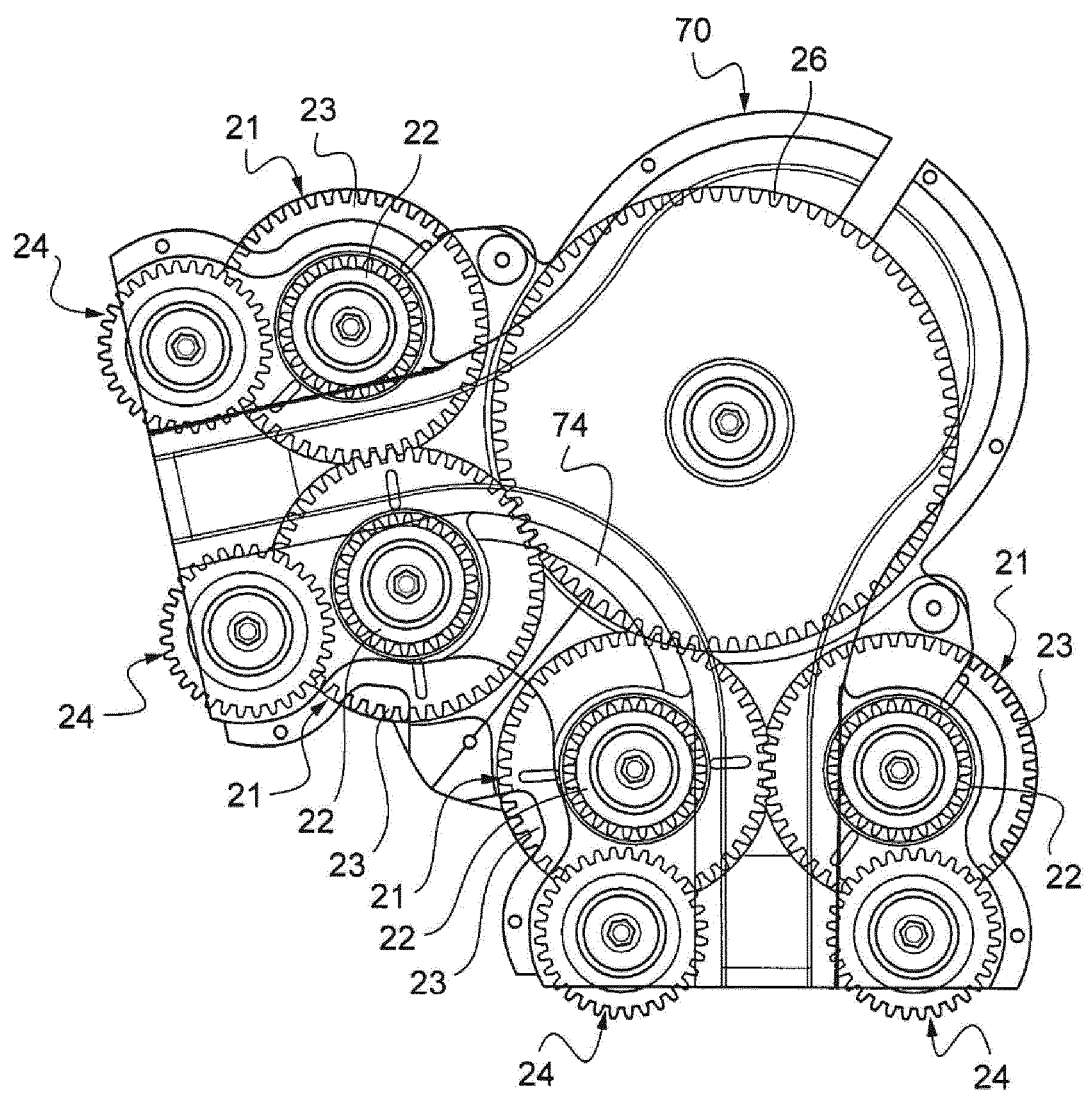

[Fig. 6]
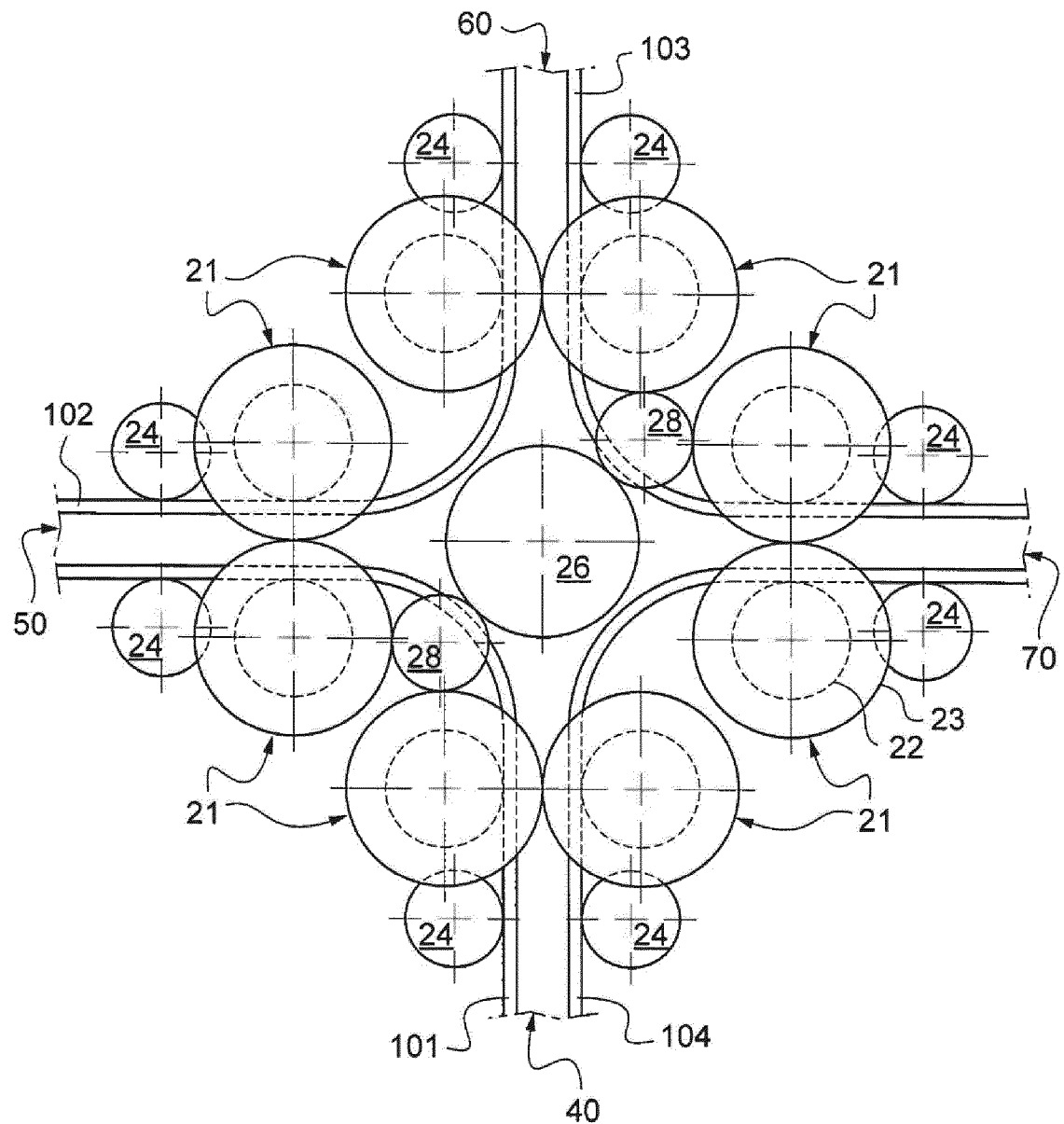

RIGID MULTILINEAR ACTUATOR WITH FLEXIBLE STRAND

FIELD OF THE INVENTION

The present invention relates to the field of linear actuators designed to transmit pull and push forces with a rigid-bar-like behavior.

BACKGROUND

In many applications, a hydraulic actuator is inadequate because of its slowness, its longitudinal bulk and the presence of oil and an electric screw jack actuator offers limited mechanical characteristics while also being slow and longitudinally bulky.

Push chains have thus been proposed to lift loads. Push chains have an inverted T configuration, and the leg of the T being at a variable and controlled height. The leg of the T forms a rigid bar.

The bulk according to the axis of the leg is small.

The Applicant has made it possible to use this technology for small automations with the linear actuator of the patent EP 1 399 683 which has been widely distributed. Two flexible strands bear rigid studs drawn so as to nest and lock into one another. The mass of the mechanism is very low.

There is a need for an actuator with a combined action according to distinct axes. Two distinct actuators could act according to two distinct axes but require synchronization.

SUMMARY

The Applicant has developed an actuator capable of exerting a force according to several axes. The actuator is multilinear to the extent that it is designed to push according to at least two directions, in particular non-parallel directions.

The multilinear actuator is capable of transmitting a pull force and a push force according to at least two different directions. The actuator comprises at least two complementary actuating strands made based on a flexible synthetic material, and provided on a first one of their faces with evenly spaced studs. Each stud is provided with two opposite front faces, with a front transverse active face, with a rear transverse active face, with a longitudinal active face separating the front transverse active face and the rear transverse active face, and with a longitudinal face for connection with the strand. The studs equipping the respective first faces of the two actuating strands located opposite one another mesh with one another. The front and rear transverse active faces of a stud of one of the actuating strands respectively bear against the respective rear and front transverse faces of two neighboring studs associated to the other actuating strand, while defining a section extending according to a straight line wherein the two actuating strands are securely connected. The shape and the dimensions of the space comprised between the studs of said actuating strand are complementary to those of the neighboring studs associated to the other actuating strand. Segments of the respective first faces of the two actuating strands separating the studs, as well as the longitudinal faces of said studs are provided with notches. The notches of the longitudinal face of one stud of one of the actuating strands cooperate with corresponding notches of the segment of the first face of the other strand located between the two studs associated to said stud by nesting into said corresponding notches when the two actuating strands are securely connected, so that the linear actuator section behaves like a rigid bar in one-piece. Said actuating strands comprise evenly spaced teeth on a second one of their faces, opposite to the first face. Said actuator comprises a driving member per actuating strand. Each driving member meshes with the teeth of the second face of one of said actuating strands to drive said actuating strand in translation. Said actuator comprises a first straight section in which the actuating strands are meshed, a second straight section in which the actuating strands are meshed, and a curved region located between the first straight section and the second straight section, in which the actuating strands are spaced apart.

In one embodiment, the actuator is made of non-magnetic materials.

In one embodiment, the actuating strands are independent of each other in the curved region.

In one embodiment, in the curved region, the actuating strand located inside the curve features a concavity and the actuating strand located outside the curve features a convexity, a concavity and a convexity.

In one embodiment, the actuating strand located outside the curve has, in said curved region, more studs than the actuating strand located inside the curve.

In one embodiment, the actuator comprises an even number of straight sections, for example 4 or 6, within which the actuating strands are meshed, and a curved region located between the straight sections in which the actuating strands are spaced apart. An actuating strand belongs to two angularly adjacent straight sections. An actuating strand is angularly meshed with a front actuating strand and with a rear actuating strand. Said angularly adjacent straight sections, when moving, being such that one is coming in, the other one coming out.

In one embodiment, the actuator comprises a frame supporting the driving members. The frame may comprise first and second portions hinged according to an axis parallel to the axes of the driving members, and a hinge lock capable of releasably blocking the first and second portions with respect to each other according to a selected angle. Said selected angle defines the angle between the first straight section and the second straight section. Said selected angle may be comprised between 70 and 110°. Thus, it is possible to adapt the angle between the rigid bars according to the application. A customized manufacture is avoided.

In one embodiment, the actuator comprises four driving members. One driving member is provided per second face of an actuating strand of the first straight section and one driving member is provided per second face of an actuating strand of the second straight section.

In one embodiment, each driving member comprises a first toothing engaged with the teeth of the second face of one of the actuating strands, and a second toothing concentric with the first toothing and engaged with the second toothing of the driving member meshing with the teeth of the second face of the other actuating strand, in the first straight section.

In one embodiment, each driving member comprises a first toothing engaged with the teeth of the second face of one of the actuating strands, and a second toothing concentric with the first toothing and engaged with the second toothing of the driving member meshing with the teeth of the second face of the other actuating strand, in the second straight section.

In one embodiment, a motor pinion is engaged with the second toothings of two of said driving members, one per straight section. The actuator may be provided with only one electric motor synchronously driving the actuating strands through the motor pinion and the driving members.

In one embodiment, the second toothing is offset with respect to the first toothing according to the axis of said driving member. The second toothing is disposed in the vicinity of a front face of the studs.

In one embodiment, the first toothing is a spur-type one.

In one embodiment, the first toothing is a herringbone-type one.

In one embodiment, the second toothing is a helical-type one.

In one embodiment, the second toothing is a herringbone-type one.

In one embodiment, each driving member comprises two second toothings on each side of the first toothing. The forces are exerted symmetrically.

In one embodiment, the motor pinion has an axis disposed between the actuating strands in the curved region.

In one embodiment, the motor pinion is engaged with the second toothings of two driving members disposed on the internal side of the curved region.

In one embodiment, the motor pinion is engaged with the second toothings of two driving members disposed on the external side of the curved region.

In one embodiment, the actuator comprises four guide pinions engaged with the actuating strands. One guide pinion is provided per second face of an actuating strand of the first straight section and one guide pinion is provided per second face of an actuating strand of the second straight section, remotely from the driving members, the guide pinions being mounted idle. Thus, the rigid bars are guided in an accurate manner.

In one embodiment, the actuator comprises four guide pinions engaged with the actuating strands. One guide pinion is provided per second face of an actuating strand of the first straight section and one guide pinion is provided per second face of an actuating strand of the second straight section, remote from the driving members, the guide pinions being driven by the driving members. The transmittable torque is very high.

In one embodiment, guides are disposed in contact with the second face of the actuating strand disposed outside the curved region.

In one embodiment, the driving members are provided with index foolproof keys for mounting.

In other words, the invention targets an actuator that is active in several different, in particular secant, axes. The motor drive may be unique regardless of the number of axes of the actuator. In the variant with multiple motor drives, the synchronization of the movement of each section forming a rigid bar is ensured by the control of the motors.

BRIEF DESCRIPTION OF THE DRAWINGS

Other features and advantages of the invention will appear upon examining the detailed description hereinafter, and from the appended drawings, wherein:

FIG. 1 is a schematic side elevational view of an actuator according to an aspect of the invention, FIG. 2 schematically illustrates, in a perspective view, a partially dismounted actuator according to an aspect of the invention, FIG. 3 schematically illustrates, in perspective, an actuator, the studs having been omitted, according to an aspect of the invention, FIG. 4 schematically illustrates, in perspective, an actuator, the studs having been omitted, according to an aspect of the invention, FIG. 5 schematically illustrates, in perspective, an actuator with an adjustable angle, the studs having been omitted, according to an aspect of the invention, and FIG. 6 schematically illustrates, in perspective, a quadrilinear actuator, according to an aspect of the invention.

DETAILED DESCRIPTION OF THE PREFERRED EMBODIMENTS

The appended drawings could not only be used to complete the invention, but also contribute to the definition thereof, where appropriate.

In many applications, moving an object over a rectilinear stroke of a few centimeters to a few decimeters by exerting a force of a few tens of Newton to a few hundreds of Newton requires a mechanism that is heavy, bulky, inadequate for its environment and noisy.

In the field of screen, shutter, panel, display deployment, there is a need for a double-acting bi-directional actuator and/or for an actuator with a L-shaped, rather than T-shaped, bulk.

Two three-dimensional reference frames are defined, one (X1, Y1, Z) corresponding to a first straight section and the other one (X2, Y2, Z) corresponding to a second straight section. The axis X1, X2 is the longitudinal axis of the straight section. The axis Y1, Y2 is the transverse axis of the straight section extending from one strand to another. The common axis Z defines the axis of rotation of the rotating elements of the actuator. The planes (X1, Y1) and (X2, Y2) are coincident.

In a represented embodiment, an actuator 1 comprises two complementary actuating strands 2 and 3. The actuating strands 2 and 3 are identical. The actuating strands 2 and 3 are made of a flexible synthetic material, for example PU, possibly armored, for example with aramid fibers. The actuating strands 2 and 3 are disposed parallel to each other along some portions of the actuator 1, according to the longitudinal axis X1, X2, and farther spaced apart along other portions of the actuator 1.

The actuating strands 2 and 3 are shaped like a belt with a length comprised between a few decimeters and a few meters, a width in the range of a few centimeters according to the axis Z and a thickness in the range of a few millimeters. The actuating strands 2 and 3 have smooth edges 4 extending across the thickness. Said edges 4 are parallel. Said edges 4 are planar in a plane (X1, Y1) or (X2, Y2). The actuating strands 2 and 3 have first and second faces 5, 6 extending width wise. The first and second faces 5, 6 are opposite one another. The first internal faces 5 are disposed opposite the other actuating strand and the second external faces 6, on the side opposite to the other actuating strand. The first and second faces 5, 6 are directed according to the axis Z.

The actuator 1 comprises evenly spaced studs 7 disposed on the first faces 5 of the strands. The studs 7 are identical. The studs 7 are complementary and thus one stud 7 is adapted to be engaged between and with two associated studs 7 of the other strand. The engaged studs 7 are in a head-to-tail position. The studs 7 are made of a rigid synthetic material, for example POM, where appropriate fitted with a mineral charge, for example glass fibers. The studs 7 are fastened to the strand by form-fitting and screwing or riveting.

Each stud 7 is provided with two opposite front faces 8. The front faces 8 are planar in a plane (X1, Y1) or (X2, Y2). The front faces 8 are coplanar with the edge of the corresponding strand. The front faces 8 are coplanar with the front faces 8 of the complementary studs 7 and with the edge 4 of the opposite strand.

Each stud 7 is provided with a front transverse active face 9 and with a rear transverse active face 10, directed according to the axis Z. The front and rear notion is, herein, a convention because of the alternating movement of the actuator 1. By active face, it should be understood a face cooperating with the complementary studs 7 and/or the complementary strand.

Each stud 7 is provided with a longitudinal active face 11 separating the front transverse active face 9 and the rear transverse active face 10, and with a longitudinal face 12 for connection with the strand to which said stud 7 is fastened. The longitudinal active face 11 generally lies according to a plane (X1, Z) or (X2, Z). The longitudinal active face 11 is provided with reliefs complementary to the internal face 5 of the opposite strand.

The connecting longitudinal face 12 is profiled according to the axis Z. The connecting longitudinal face 12 is provided with reliefs complementary to the internal face 5 of said strand. The internal face 5 of said strand may be provided with a boss 13 having a trapezoidal section fitting into a groove 14 of the connecting longitudinal face 12. The boss 13 may have a height according to the axis Z larger than the height of said complementary reliefs of the longitudinal active face 11. The boss 13 is surrounded according to the axis X1, X2 by skirts 15 of the stud 7 ensuring centering of the stud 7 on the boss 13. The skirts 15 of the stud 7 come into contact with the bottom of the internal face 5 of said strand neighboring the boss 13.

Thus, the studs 7 equip the respective first faces 5 of the two actuating strands 2, 3 which are located opposite one another over all or part of the stroke of the actuator 1. The studs 7 are configured so as to mesh with one another in meshing areas in which the actuating strands 2, 3 get close to each other and to disengage from one another in disengagement areas in which the actuating strands 2, 3 get spaced apart. In the meshing areas, the front 9 and rear 10 transverse active faces of a stud 7n of rank n, cf. FIG. 1, of one of the actuating strands 2, 3 respectively bear against the respective rear 10 and front 9 transverse faces of two neighboring studs 7n-1 and 7n+1 associated to the other actuating strand 3, 2. Said neighboring studs 7n-1 and 7n+1 have immediately lower and higher ranks. After meshing, the two strands and the meshed studs 7n−1, 7 and 7n+1 defining a section extending according to a straight line. The straight section is resistant in compression and in bending as well as in shearing between the studs 7.

The front 9 and rear 10 transverse active faces of a stud 7 have a central area and two edge areas surrounding the central area. In the represented embodiment, the central area is substantially planar according to a plane (Y1, Z) or (Y2, Z).

The central area is normal to the axis of movement of the stud 7 or longitudinal axis X1, X2. The edge areas are symmetrical with respect to a plane (X1, Y1) passing through the longitudinal axis and equidistant from the lateral faces of the studs 7. The edge areas have a double curvature, with a proximal concave portion and a distal convex portion of the actuating strand 2, 3 secured to the stud. The studs 7 are symmetrical with respect to a plane (Y1, Z).

Between the edge areas and the central area, there is a stabilization or step surface parallel to a plane (X1, Y1). The edge areas are recessed with respect to the central area in the concave portion and in relief in the convex portion. The stabilization surface normal to the axis Z prevents an offset of one stud 7 relative to the two neighboring studs engaged according to the axis Z. Two studs 7 meshed together are prevented from slipping relative to one another in the lateral direction—axis Z—by the difference in the shape between the edge areas, on the one hand, and the central area, on the other hand. Two meshed studs 7 are prevented from being detached from each other in the transverse direction—axis Y1, Y2—by the form-fitting between the concave and convex portions. The front convex portion of one stud 7n of rank n fits in the rear concave portion of a stud 7n+1 of rank n+1 neighboring the actuating strand 3, 2 of the stud 7n+1 of rank n+1. The front concave portion of a stud 7n of rank n neighboring the actuating strand 2, 3 of the stud 7n of rank n receives the rear convex portion of a stud 7n+1 of rank n+1. An interlocking is achieved.

Two successive studs 7 secured to the same actuating strand 2, 3 are free to pivot relative to one another outside the meshing areas. The pivoting is done according to a lateral axis Z. In the meshing areas, each stud 7 bears on the adjacent studs 7 thereby ensuring the compressive strength. The tensile strength is ensured by the tensioned rigid actuating strands 2, 3.

The torsion and bending strength is ensured by the form-fitting, the mutual bearing of the studs 7 and the tensile rigidity of the actuating strands 2, 3.

When the two actuating strands 2, 3 are securely connected, the shape and the dimensions of the space comprised between the studs 7 of said actuating strand 2, 3 are complementary to the shape and to the dimensions of the neighboring studs 7 associated to the other actuating strand 3, 2.

Furthermore, the respective first faces 5 of the two actuating strands 2, 3 comprise segments separating the studs 7. Said segments 16 separating the studs 7 are free when the actuating strands are spaced apart. Said segments 16 generally lie according to a plane (X1, Z) or (X2, Z) in the straight sections.

Said segments 16 are provided with notches 17. The longitudinal active faces 12 of said studs 7—opposite to the first face 5 of the actuating strand bearing said studs 7 and opposite or in contact with the first face 5 of the other actuating strand—are provided with notches 18. The notches 17 of the segments 16 and the notches 18 of the studs 7 are complementary. The notches 17 of the segments 16 are profiled according to a lateral axis Z.

The notches 17 and 18 block the longitudinal shearing between the stud 7 of one actuating strand 2, 3 and the other actuating strand 3, 2. The notches 17 and 18 have fairly low slopes to enable disengagement.

The notches 17 of the longitudinal active face 12 of a stud 7n of one of the actuating strands cooperate with the corresponding notches 18 of the first face 5 of the other actuating strand located between the two studs 7n−1 and 7n+1 associated to said stud 7. Said notches 17 nest into said corresponding notches 18 when the two actuating strands 2 and 3 are securely connected. Thus, the linear actuator section 1 behaves like a rigid bar.

Said actuating strands 2, 3 have a second face 6 opposite to the first face 5. The second face 6 is external, in particular with respect to a straight section. On said second face 6, said actuating strands 2, 3 comprise evenly spaced teeth 20 forming a rack. The teeth 20 are profiled according to a transverse axis. The teeth 20 are evenly distributed. The teeth 20 have a constant period. The teeth 20 have a constant height.

The actuator 1 comprises one driving member 21 per actuating strand 2, 3. Each driving member 21 meshes with the teeth 20 of the second face 6 of one of said strands. Thus, the driving member 21 is capable of driving said actuating strand 2, 3 in translation according to the axis X1, X2.

Said actuator 1 comprises a first straight section 40 wherein the actuating strands 2, 3 are meshed, a second straight section 50 wherein the actuating strands 2, 3 are meshed, and a curved region 60 located between the first straight section 40 and the second straight section 50, wherein the actuating strands 2, 3 are spaced apart. The first straight section 40 and the second straight section 50 have secant or parallel longitudinal axes X1 and X2.

The actuating strands 2, 3 are independent of each other in the curved region 60. In the case of a first straight section 40 and a second straight section 50 with secant longitudinal axes X1 and X2, the actuating strand 2 located inside the curve features a concavity. The actuating strand 3 located outside the curve features a convexity, a concavity and a convexity. In other words, the actuating strand 3 starting from the first straight section 40 deviates from the axis X1, and then gets close thereto and intersects with it and starting from the second straight section 50 deviates from the axis X2, and then gets close thereto and intersects with it.

The actuating strand 3 located outside the curve has in said curved region 60 more studs 7 than the actuating strand 2 located inside the curve.

The external strand 3 herein has six studs 7 more than the internal strand.

Each driving member 21 comprises a pinion with a width substantially equal to the teeth 20 of the second face 6 of said strands. The teeth 20 extend from one edge to another of said strands. The teeth 20 of said strands and the teeth of the pinions are herein straight. The pinion forms a first toothing 22. Alternatively, a herringbone toothing is provided cooperating with a herringbone toothing of the rack of the second face 6 of said strands. Each driving member 21 has an axis of rotation parallel to the axis Z. In the embodiment represented in FIGS. 1 to 3, four driving members 21 are mounted. A first driving member 21 cooperates by meshing with the second face 6 of the actuating strand 3 of the first straight section 40 located outside the curve in the curved region 60. A second driving member 21 cooperates by meshing with the second face 6 of the actuating strand 3 of the second straight section 50 located outside the curve in the curved region 60. A third driving member 21 cooperates by meshing with the second face 6 of the actuating strand 2 of the first straight section 40 located inside the curve in the curved region 60.

A fourth driving member 21 cooperates by meshing with the second face 6 of the actuating strand 2 of the second straight section 50 located inside the curve in the curved region 60. Thus, each actuating strand 2, 3 is set in movement by two driving members 21 located on either side of the curved region 60. According to another perspective, the first straight section 40 is set in movement by two driving members 21 located on either side of said first straight section 40. The second straight section 50 is set in movement by two driving members 21 located on either side of said second straight section 50.

Advantageously, the driving members 21 of a pair of driving members 21 mounted on either side of one of said straight sections 40, 50 have axes located in the same plane normal to the longitudinal axis X1, X2 of said straight section.

The first toothing 22 or pinion is engaged with the teeth 20—rack—of the second face 6 of one of the actuating strands 2, 3. Each driving member 21 comprises a second toothing 23 concentric with the first toothing 22 and engaged with the second toothing 23 of the driving member 21 meshing with the teeth 20 of the second face 6 of the other actuating strand of the same straight section. The first toothing 22 has a small diameter and the second toothing 23 has a large diameter. The first toothings of the driving members 21 have equal numbers of teeth. The second toothings of the driving members 21 have equal number of teeth. Thus, for the first straight section 40, the driving members 21 are synchronized by meshing. For the second straight section 50, the driving members 21 are synchronized by meshing.

A motor pinion 26 is engaged with the second toothings of two of said driving members 21, each associated to one of the straight sections. The motor pinion 26 has the axis Z as an axis. The motor pinion 26 drives a first driving member 21 of each of said pairs of driving members 21. Each pair of driving members 21 is synchronized by meshing.

In the represented embodiment, the motor pinion 26 is disposed with an axis located between the actuating strands 2, 3 in the curved region 60. A motor pinion 26 shaft 27 may be mounted through between the actuating strands 2, 3 in the curved region 60 according to said axis. The motor pinion 26 is engaged with the driving members 21 having axes located on the concave side of the actuating strands 2 located inside the curve. The motor pinion 26 comprises a number of teeth larger than the number of teeth of the second toothings of the driving members 21.

In another embodiment, the motor pinion 26 is disposed with an axis located between the actuating strands 2, 3 in the curved region 60. The motor pinion 26 is engaged with the driving members 21 having axes located on the side of the actuating strand 3 located outside the curve. The motor pinion 26 comprises a number of teeth larger than the number of teeth of the second toothings and larger than the number of teeth of the motor pinion 26 of the previous embodiment.

In another embodiment, the motor pinion 26 is disposed with an axis located on the concave side of the actuating strand located inside the curve. The motor pinion 26 is engaged with the driving members 21 having axes located on the side of the actuating strand 2 located inside the curve. The motor pinion 26 comprises a number of teeth smaller than the number of teeth of the motor pinion 26 of the previous two embodiments. The number of teeth of the motor pinion 26 is smaller than or equal to the number of teeth of the second toothings. With the same linear speed, the rotational speed of the motor pinion 26 is higher and the torque is lower. The bulk is reduced in the vicinity of the actuating strand located outside the curve. The motor pinion 26 is driven by an electric motor, with a reducer or in direct engagement.

In a driving member 21, the second toothing 23 is offset with respect to the first toothing 22 according to the axis of said driving member 21. The second toothing 23 is disposed opposite and in the vicinity of a front face of the studs 7.

In one embodiment, each driving member 21 is symmetrical with respect to a plane (X1, Y1) normal to its axis and passing through the middle of the first toothing 22. Thus, each driving member 21 comprises two second toothings 23 disposed on each side of the first toothing 22. The second toothings 23 of a pair of driving members 21 are mounted on each side of the straight section 40, 50 whose actuating strands 2, 3 mesh with the first toothings 22 of said pair of driving members 21. Said second toothings 23 of a pair of driving members 21 mesh with one another.

The first toothing 22 is a spur or herringbone one. The second toothing 23 is a helical or herringbone one.

Furthermore, four pinions 24 for guiding the actuating strands 2, 3 are mounted. A pair of guide pinions 24 is provided for each straight section. The guide pinions 24 increase the stability of the corresponding straight section.

The guide pinions 24 are engaged by meshing with the actuating strands 2, 3. One of said guide pinions 24 cooperates with each second face 6 of an actuating strand of the first straight section 40. One of said guide pinions 24 cooperates with each second face 6 of an actuating strand 2, 3 of the second straight section 50. The axes of the guide pinions 24 are disposed remotely from the axes of the driving members 21. The axes of the guide pinions 24 are parallel to the axis Z. The axes of the guide pinions 24 are disposed in the same plane (Y1, Z) or (Y2, Z). The guide pinions 24 are disposed remotely from the first toothings of the driving members 21. With the guide pinions 24, each straight section 40, 50 behaves in the same manner as a built-in beam.

In the represented embodiment, the guide pinions 24 are mounted idle. In another embodiment, the guide pinions 24 are driven by the driving members 21. A high torque could be transmitted to the corresponding straight section. The drive may be performed by belt or, preferably, through a non-represented intermediate pinion.

The first toothings 22 herein have 26 teeth. Teeth with a smaller module may be provided to allow reducing the diameter of the first toothings 22 of the driving members 21 and the bulk.

A frame 70 is provided supporting the driving members 21 and the guide pinions 24, where appropriate. A frame 70 comprises plates 71 supporting the shafts of the motor pinion 26, of the driving members 21 and of the guide pinions 24. Furthermore, two guides 72, 73 are mounted to guide the external actuating strand 3 within the concavity of said external actuating strand 3 in the curved region 60. The guides 72, 73 consist of pads coated with a low-friction layer, in the represented embodiment, or with cylindrical rolls. The guides 72, 73 are in contact with the second face 6 of the external actuating strand 3. The guides 72, 73 are supported by the plates 71. The position of the internal actuating strand 2 is determined upon mounting by the number of teeth 20 between the first toothing 22 of the driving member 21 engaged with the internal actuating strand 2 and located on the front side and the first toothing 22 of the driving member 21 engaged with the internal actuating strand 2 and located on the rear side. To facilitate mounting by the operator, a guide 74 may be provided inside the curved region 60, to guide the internal actuating strand 2 within the concavity of said internal actuating strand 2 in the curved region 60. The guide 74 may comprise a pad coated with a low-friction layer, in the represented embodiment, or with a cylindrical roll. The guide 74 is in contact with the second face 6 of the internal actuating strand 2. The guide 74 is supported by the plates 71.

In the represented embodiment of FIGS. 1 to 4, the frame 70 is rigid. The studs 7 of the external actuating strand 3 are very close to each other, and possibly in contact with each other, by their front 9 and rear 10 transverse active faces. Thus, the represented embodiment is as compact as possible in terms of bulk on the exterior of the curved region 60. It is possible to provide for a curved region 60 having a larger excrescence from the external actuating strand 3 outwardly. The interior and exterior notion herein relates to the angle formed by the axes X1 and X2.

In the represented embodiment of FIG. 4, the actuator comprises a member 81 for setting the distance—according to the axis Y1, Y2—between the guide pinions 24 mounted on either side of a straight section. The setting member 81 herein comprises a screw provided with a drive recess and engaged with a threaded bore supported by a portion 80 of the frame 70.

In the represented embodiment of FIG. 5, the frame 70 may comprise first and second portions hinged according to an axis parallel to the axes of the driving members 21, and a hinge lock capable of releasably blocking the first and second portions with respect to each other according to a selected angle, said selected angle defining the angle between the first straight section 40 and the second straight section 50. The angle is set within a range comprised between 70 to 110°, more particularly between 75 and 90°.

The driving members 21 are provided with index foolproof keys 25 for mounting. Thus, the operator proceeds with the orientation of the driving members 21 enabling a proper operation of the actuator 1.

Depending on whether the actuating strand or the straight section is considered, the actuator 1 comprises at least one pair of actuating strands, or a first straight section, a curved region and a second straight section.

In another embodiment, the actuator 1 is quadrilinear, cf. FIG. 6, or hexalinear, octolinear, etc. In other words, the actuator 1 comprises an even number of straight sections. In FIG. 6, the studs have been omitted to improve readability. The actuator 1 has a cross-like shape having the angles indicated hereinabove between its branches. In FIG. 6, the angle is 90°. The possible angle between two neighboring straight sections extends over a wider range than in the previous embodiment, for example from 5 or 10° and up to 170 or 175°.

A first actuating strand 101 belongs partly to a first straight section 40 and partly to a second straight section 50. A second actuating strand 102 belongs partly to the second straight section 50 while meshing with the first actuating strand 101 and partly to a third straight section 60. A third actuating strand 103 belongs partly to the third straight section 60 while meshing with the second actuating strand 102 and partly to a fourth straight section 70. A fourth actuating strand 104 belongs partly to the fourth straight section 70 meshing with the third actuating strand 103 and partly to the first straight section 40 while meshing with the first actuating strand 101. Each actuating strand has a portion with a convexity directed towards the center of the actuator 1. Each actuating strand is free of any curvature change. Each actuating strand has a first straight portion within one straight section, a second straight portion within another straight section and a curved portion with a curvature between the first and second straight portions.

The motor pinion 26 is disposed at the center of the actuator 1. The motor pinion 26 meshes with two idler pinions 28. Each idler pinion 28 drives two driving members 21, said two driving members 21 being remote from each other. Each idler pinion 28 meshes with the second toothing 23 of each of said two driving members 21. Each of the straight sections 40, 50, 60 and 70 is engaged with one of the driving members 21 driven by an idler pinion 28 and the driving member 21 driven by the preceding driving member 21. Each of the first and third actuating strands 101 is driven by a driving member 21 driven by an idler pinion 28. Each of the second and fourth actuating strands 101 is driven by a driving member 21 driven by another driving member 21 which, in turn, is driven by an idler pinion 28. Setting the driving members 21 in rotation causes, in one direction, the extension of the first and third straight sections and shortening of the second and fourth straight sections, in an opposite direction, the extension of the second and fourth straight sections and shortening of the first and third straight sections. The motor pinion 26 may be unique and drive four master driving members 21, each master driving member, in turn, driving a slave driving member with which it forms a pair of driving members 21 associated to the same straight section.

The invention claimed is:

1. A multilinear actuator capable of transmitting a pull force and a push force according to at least two different directions, said actuator comprising at least two complementary actuating strands made based on a flexible synthetic material, and provided on a first one of their faces with evenly spaced studs, each stud being provided with two opposite front faces, and with a front transverse active face, with a rear transverse active face, with a longitudinal active face separating the front transverse active face and the rear transverse active face, and with a longitudinal face for connection with the strand, the studs equipping the respective first faces of the two actuating strands located opposite one another mesh with one another, and the front and rear transverse active faces of a stud of one of the actuating strands respectively bear against the respective rear and front transverse faces of two neighboring studs associated to the other actuating strand, while defining a section extending according to a straight line wherein the two actuating strands are securely connected, and the shape and the dimensions of the space comprised between the studs of said actuating strand are complementary to those of the neighboring studs associated to the other actuating strand, segments of the respective first faces of the two actuating strands separating the studs, as well as the longitudinal faces of said studs are provided with notches, the notches of the longitudinal face of one stud of one of the actuating strands cooperating with corresponding notches of the segment of the first face of the other strand located between the two studs associated to said stud by nesting into said corresponding notches when the two actuating strands are securely connected, so that the linear actuator section behaves like a rigid bar in one-piece, said actuating strands comprising evenly spaced teeth on a second one of their faces, opposite to the first face, said actuator comprising a driving member per actuating strand, each driving member meshing with the teeth of the second face of one of said actuating strands to drive said actuating strand in translation, said actuator comprising a first straight section in which the actuating strands are meshed, a second straight section in which the actuating strands are meshed, and a curved region located between the first straight section and the second straight section, in which the actuating strands are spaced apart.

2. The actuator according to claim 1, wherein the actuating strands are independent of each other in the curved region, the actuating strand located inside the curve features a concavity and the actuating strand located outside the curve features a convexity, a concavity and a convexity, and has in said curved region more studs than the actuating strand located inside the curve.

3. The actuator according to claim 1, comprising an even number of straight sections within which the actuating strands are meshed, and a curved region located between the straight sections wherein the actuating strands are spaced apart, an actuating strand belonging to two straight sections and angularly meshed with a front actuating strand and with a rear actuating strand, said angularly adjacent straight sections, when moving, being such that one is coming in, the other one coming out.

4. The actuator according to claim 1, further comprising a frame supporting the driving members and comprising first and second portions hinged according to an axis parallel to the axes of the driving members, and a hinge lock capable of releasably blocking the first and second portions with respect to each other according to a selected angle, said selected angle defining an angle between the first straight section and the second straight section.

5. The actuator according to claim 1, wherein the actuator comprises four driving members, one per second face of an actuating strand of the first straight section and one per second face of an actuating strand of the second straight section.

6. The actuator according to claim 1, wherein each driving member comprises a first toothing engaged with the teeth of the second face of one of the actuating strands, and a second toothing concentric with the first toothing and engaged with the second toothing of the driving member meshing with the teeth of the second face of the other actuating strand, in the first straight section, on the one hand, and in the second straight section, on the other hand, and a motor pinion is engaged with the second toothing of two of said driving members, one per straight section.

7. The actuator according to claim 5, wherein the second toothing is offset with respect to the first toothing according to the axis of said driving member and disposed in the vicinity of a front face of the studs, the first toothing is a spur or herringbone one and the second toothing is a helical or herringbone one, and each driving member comprises two second toothings on either side of the first toothing.

8. The actuator according to claim 5, wherein the motor pinion has an axis disposed between the actuating strands in the curved region and is engaged with the second toothings of two driving members disposed on the internal side or on the external side of the curved region.

9. The actuator according to claim 1, further comprising four guide pinions engaged with the actuating strands, one per second face of an actuating strand of the first straight section and one per second face of an actuating strand of the second straight section, the axes of the guide pinions being remote from the axes of the driving members, the guide pinions being mounted idle or driven by the driving members.

10. The actuator according to claim 1, wherein guides are disposed in contact with the second face of the actuating strand disposed outside the curved region.

* * * * *